United States Patent [19]
Ornstein et al.

[11] Patent Number: 6,113,978
[45] Date of Patent: Sep. 5, 2000

[54] METHODS AND COMPOSITIONS TO PROTECT ASPHALTIC MATERIALS

[76] Inventors: Ian Neal Ornstein, 6655 Donnabeatrix Cir., Tucson, Ariz. 85718; Geoffrey Charles Christ, 652 Main St., Wakefield, Mass. 01880

[21] Appl. No.: 09/358,305

[22] Filed: Jul. 21, 1999

Related U.S. Application Data

[60] Provisional application No. 60/099,699, Sep. 10, 1998.

[51] Int. Cl.[7] .............................. C08L 95/00; E01C 5/12; B05D 1/02
[52] U.S. Cl. ...................... 427/136; 427/186; 427/393.4; 427/421
[58] Field of Search .................................... 427/136, 138, 427/186, 393.4, 421

[56] References Cited

U.S. PATENT DOCUMENTS

| | | | |
|---|---|---|---|
| 5,247,008 | 9/1993 | Michels et al. ........................ | 524/544 |
| 5,387,640 | 2/1995 | Michels et al. ........................ | 524/544 |
| 5,439,998 | 8/1995 | Lina et al. ............................. | 526/243 |
| 5,674,961 | 10/1997 | Fitzgerald ............................. | 526/273 |
| 5,753,569 | 5/1998 | Michels et al. ........................ | 442/88 |
| 5,798,415 | 8/1998 | Corpart et al. ........................ | 525/129 |
| 5,919,527 | 7/1999 | Fitzgerald et al. .................... | 427/389.7 |

FOREIGN PATENT DOCUMENTS 0714870  6/1996  European Pat. Off. .

*Primary Examiner*—Peter A. Szekely
*Attorney, Agent, or Firm*—Kevin T. Mansfield

[57] ABSTRACT

Asphaltic materials are provided with increased resistance to damage from water, oil and weather by a process which comprises treating said materials with an aqueous composition containing: (A) from about 0.1 to 4% by weight, on a 100% solids basis, of an aqueous solution or self-dispersed emulsion or dispersion of a copolymer which is a reaction product of monomers containing fluorinated groups, cationic groups and nonionic groups, optionally (B) an effective amount of a penetration assistant, and (C) water to make up 100%.

11 Claims, No Drawings

METHODS AND COMPOSITIONS TO PROTECT ASPHALTIC MATERIALS

This application is a provision of Ser. No. 60/099,699 filed Sep. 10, 1998.

The present invention relates to methods and compositions to protect asphaltic materials from water, oil and weather damage. More particularly it relates to methods and compositions which comprise applying certain cationic fluorochemical copolymer compositions to asphaltic material such as an asphaltic traffic-bearing surface or roofing material to protect the asphaltic material from such damage.

BACKGROUND OF THE INVENTION

The terms asphalt and bitumen are often used synonymously in the U.S. to refer to a generic class of amorphous, dark-colored thermoplastic materials composed principally of high molecular weight hydrocarbons. The primary source of asphalt is petroleum oil, where it is obtained as the heavy residue which remains after the volatile gasoline and oil components have been removed by distillation.

Asphalt serves primarily as a binder in mixtures of asphalt and mineral aggregates which are employed in the construction of roads and similar traffic-bearing surfaces such as driveways, parking areas and airport runways. As such it generally comprises 4 to 10 weight percent of the mixture, which is sufficient to coat the mineral aggregate. Asphaltic road paving material is sometimes also referred to as asphalt or "blacktop". According to the review article "Asphalt and Bitumin" by Corbett and Urban in Ullmann's Encyclopedia of Industrial Chemistry, Fifth Ed. (1985), Vol. A3, pages 169–188, over 90% of all traffic-bearing areas are constructed with asphalt mixes.

Although asphaltic traffic-bearing areas are compacted by hot rolling, they are still more porous than surfaces of concrete. There is also an upper layer of asphalt-coated aggregate which is directly exposed to sunlight, air, temperature extremes, rain, snow, ice, vehicle exhaust emissions and fluid leaks (primarily engine oil but also gasoline, diesel fuel and antifreeze solutions), and salts used to dissolve snow and/or ice. Additionally, airport traffic-bearing surfaces are exposed to aviation fuel spills, hot jet engine exhaust and, in cold weather, to aircraft deicing fluids. A major problem in cold climates is freeze-thaw damage from ice, but all of the above exposures lead to degradation of asphaltic traffic-bearing materials. As a result a huge amount of money is expended each year to repair or resurface such materials. Thus there is a clear need for a cost-effective way of extending the useful lifetime of asphaltic traffic-bearing areas.

Asphalt is also used in roofing materials. Asphalt composition shingles, which are used as roofing materials on more than 95% of private dwellings in North America according to the above-mentioned Ullmann's article, consist of a glass fiber or cellulosic backing coated on both sides with a filled asphalt and surfaced on the weather surface with mineral granules. The filed asphalt serves as a binder for both the backing material and the mineral granules. Asphalt is also used as both the binder and upper surface of single and multilayer roofing systems. These asphaltic weather surfaces are subjected to many of the same exposures as a roadway, that is, sunlight, air, temperature extremes, rain, snow and freeze-thaw damage from ice, and eventually replacement is required. A cost-effective way of extending the useful lifetime of asphalt composition shingles and other asphaltic roofing surfaces would therefore also be highly desirable.

It is known that fluorochemicals, particularly certain fluorochemical copolymers, can be used to impart water, oil or grease repellency to paper and paper products, and to textile fibers such as nylon used in carpets and upholstered furniture. It is also known that certain fluorochemical copolymers can be used in combination with other substances to improve the resistance of certain construction materials to water and oil damage. For example JP 9286676 A teaches to employ an aqueous emulsion of a fluororesin which is a copolymer of a fluoro-olefin, a carboxylic acid vinyl ester and unsaturated monomers having hydrophilic functional groups with a water emulsion of a silane compound which has hydrolyzable functional groups to form a water-repellent, weather-resistant coating on the surface of cured concrete.

EP-A 0 714 921 teaches two component resin compositions for water-repellent coatings for textiles and building materials which comprise a fluorinated acrylic copolymer component which also contains cationic amino groups, either in salt or quaternized form, and other functional groups, and a polyisocyanate component. On mixing the two water-based components and applying the mixture to building materials, they harden rapidly to a coating which imparts stable water- and oil-repellent, anti-graffiti properties to the treated substrates.

U.S. Pat. No. 5,753,569 teaches a two component coating treatment to render substrates selected from the group consisting of naturally occurring and synthetic textiles and their mixtures, leather, mineral substances, thermoplastic and thermosetting polymers and paper, oil-, water- and soil-repellent by applying thereto compositions containing components A and B, wherein component B is a fluorine-free poly(meth)acrylate ester and component A is fluorine-containing and comprises repeating units from a) 40 to 85% by weight of (meth)acrylates containing perfluoroalkyl groups, b) 1 to 45% by weight of one or more monomers from the group consisting of styrene, acrylonitrile, vinyl acetate, vinyl propionate and (meth)acrylate esters, c) 4 to 30% by weight of (meth)acrylate esters of polyether polyols and d) 1 to 15% by weight of ionic or ionizable monomers which contain either an amino or a carboxyl function.

EP-A 0 714 870 teaches an oleophobic and hydrophobic treatment for certain construction materials which comprises applying to the surface of the materials to be treated a mixture of a water soluble cationic fluorinated acrylic copolymer of the type disclosed in U.S. Pat. No. 5,493,998 and a polymeric film former, polyvinyl alcohol. The copolymers are reaction products of a perfluoroalkylethyl acrylate, a dialkylalkylaminoethyl methacrylate, vinyl acetate and optionally a fourth monomer such as butyl methacrylate. While some protection can be provided by saturating a surface with an aqueous solution of the copolymer alone, the high concentration of the water-soluble cationic fluorinated acrylic copolymer required, 20–25%, makes this approach unattractive and impractical.

None of the above-mentioned references teach how to protect an asphaltic surface. Additionally, all of the above surface treatments, whether they employ cross-linked resins or physical mixtures with a polymeric film former, form coatings which seal the surface of the substrate. Apart from the esthetically undesirable shiny and unnatural appearance, a coating will normally make a surface more slippery and prevent water drainage. These properties would be highly undesirable in a surface treatment for asphaltic traffic-bearing areas such as driveways, parking areas, roadways and airport runways for example, and one skilled in the art would avoid such coatings. They would also be ruled out for use on asphalt composition shingles on esthetic grounds.

It was therefore and object of this invention to find a one component surface treatment for asphaltic materials which was free of crosslinking agents and fluorine-free film-forming polymers, which would not impart a shiny and unnatural appearance to treated surfaces, would not impair traction on treated traffic bearing areas and which would extend the useful lifetime of the asphaltic materials by providing protection to asphaltic materials from water, oil and weather damage.

Surprisingly, it has now been found that asphaltic materials, such as traffic bearing areas and roofing materials, can be provided with increased resistance to damage from water, oil and weather, while remaining porous and retaining a natural appearance, by treating them with a composition comprising a dilute aqueous solution or self-dispersed emulsion or dispersion of certain cationic, fluorinated copolymers, optionally in the presence of an effective amount of a penetration assistant.

DETAILED DISCLOSURE OF THE INVENTION

The present invention comprises a composition which provides asphaltic materials with increased resistance to damage from water, oil and weather, which composition comprises:

(A) from about 0.1 to 4% by weight, on a 100% solids basis, of an aqueous solution or self-dispersed emulsion or dispersion of a copolymer which is a reaction product of monomers containing fluorinated groups, cationic groups and nonionic groups, optionally (B) an effective amount of a penetration assistant, and (C) water to make up 100%, with the proviso that if the copolymer is a reaction product of monomers which include 1% or more of vinyl acetate, the composition also contains from about 0.01 to 1% by weight of a penetration assistant.

Preferably the treating compositions comprise from about 0.2 to 2% by weight of the aqueous solution or self-dispersed emulsion or dispersion of the copolymer on a 100% solids basis, more preferably from 0.4 to 1% of the copolymer, and from about 0.01 to 1% by weight, more preferably from 0.05 to 0.4% by weight of the penetration assistant.

The treating compositions may also contain up to about 2% by weight of a water-miscible organic solvent such as acetone, dioxane, tetrahydrofuran, dimethyl formamide, N-methyl-pyrrolidone, dimethylsulfoxide, ethanol, isopropanol, methyl isobutyl ketone, ethylene glycol or propylene glycol, such solvents being commonly employed during the synthesis of the copolymers. Additionally the penetration assistant may be added as a solution in an organic solvent. Preferably however the treating compositions contain no or only low amounts of organic solvents for health, safety and ecological reasons.

The treating composition may also advantageously contain conventional additives which are compatible with the mixture of the aqueous solution or self-dispersed emulsion or dispersion of the copolymer and the penetration assistant. In particular the treating composition may contain an effective amount of a preservative such as an antimicrobial, a bactericide, a fungicide or an algicide. Many such materials and commercial sources thereof are listed in McCutcheon's 1994 Volume 2: Functional Materials, North American Edition, McCutcheon's Division, MC Publishing Co., Glen Rock, N.J.

Component (A) suitably contains a copolymer which is a reaction product of one or more meth(acrylate) monomers containing polyfluorinated alkyl groups, cationic nitrogen groups which are partially or fully quaternized or in the form of a salt, and nonionic groups. To obtain a satisfactory balance of hydrophobic and oleophobic properties it is preferred that the copolymer be a reaction product of from about 60–90% by weight of one or more meth(acrylate) monomers containing polyfluorinated alkyl groups, from about 10 to about 30% by weight of one or more meth(acrylate) monomers containing cationic groups which are partially or fully quaternized or in the form of a salt and from about 1 to about 10% by weight of one or more monomers containing nonionic groups.

Suitable monomers containing nonionic groups include ethylene, propylene, isobutene, chloro-3-isobutene-1, butadiene, isoprene, chloro- and dichloro-butadienes, fluoro- and difluoro-butadienes, vinylidine chloride, vinyl- or vinylidine fluoride, allyl bromide, methallyl chloride, vinyl-toluene, alpha-methylstyrene, alpha-cyanomethylstyrene, divinylbenzene, N-vinyl-carbazole, methyl vinyl ketone, allyl acetate, allyl propionate, allyl isobutyrate, allyl heptanoate, cetyl vinyl ether, dodecyl vinyl ether, allyl-, methyl-, ethyl-, propyl-, isopropyl-, butyl-, isobutyl-, hexyl-, heptyl-, ethyl-2-hexyl-, cyclohexyl-, lauryl-, stearyl- or ethoxyethyl esters of acrylic, methacrylic, alpha-chloroacrylic, crotonic, maleic, fumaric, itaconic, citraconic and senecioic acid, glycol or polyalkyleneglycol diacrylates and dimethacrylates, acrylonitrile, methacrylonitrile, chloro-2-acrylonitrile, cyano-2-ethyl acrylate, methylene glutaronitrile, vinylidene cyanate, isopropyl cyanoacrylate, trisacryloyl-hexahydro-s-triazine, allyl alcohol, allyl glycolate, isobutenediol, allyloxyethanol, o-allylphenol, divinylcarbinol, glycerol-allyl ether, acrylamide, methacrylamide, maleamide and maleimide, N-(cyanoethyl)acrylamide, N-isopropyl-acrylamide, diacetone-acrylamide, N-(hydroxymethyl)-acrylamide and methacrylamide, N-(alkoxymethyl)-acrylamides and methacrylamides, glyoxal-bis-acrylamide, amino-3-crotononitrile, monoallylamine, vinylpyridines, glycidyl acrylate or methacrylate and their chlorohydrins, allyl glycidyl ether and acrolein.

Epoxy- or chlorohydrin-containing nonionic groups are preferred, with glycidyl methacrylate being especially preferred.

Said copolymers are known per se or can be prepared by the conventional free radical polymerization methods described in the references discussed above, which are incorporated by reference. Additionally, some of the copolymers of the references are commercially available. Typically the copolymers are prepared as aqueous solutions or self-dispersed emulsions or dispersions containing 20 to 35% by weight of the copolymer.

Preferably component (A) contains a copolymer which comprises monomers copolymerized in the following percentages by weight, relative to the total weight of the copolymers:

(a) from about 60% to about 90% of at least one monomer of the formula I:

$$R_f\text{—Q—A—C(O)——C(R)=CH}_2 \qquad (I)$$

wherein $R_f$ is a straight or branched-chain perfluoroalkyl group of from 2 to about 20 carbon atoms, R is H or $CH_3$, A is O, S, or N(R'), wherein R' is H or an alkyl of from 1 to 4 carbon atoms, Q is alkylene of 1 to about 15 carbon atoms, hydroxyalkylene of 3 to about 15 carbon atoms, —$(C_nH_{2n})(OC_q$ $H_{2q})_m$—, —$SO_2$—$NR'(C_nH_{2n})$—, or —$CONR'(C_nH_{2n})$—, wherein R' is H or an alkyl of 1 to 4 carbon atoms, n is 1 to 15, q is 2 to 4, and m is 1 to 15;

(b) from about 10 to about 40% of at least one monomer of the formula II:

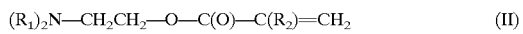
$$(R_1)_2N—CH_2CH_2—O—C(O)—C(R_2)=CH_2 \quad (II)$$

wherein $R_1$ is an alkyl group of from 1 to 3 carbon atoms, $R_2$ is H or an alkyl radical of 1 to 4 carbon atoms, and wherein the nitrogen is 40 to 100% quaternized or in the form of a salt; and (c) from about 1 to about 7% of at least one monomer of formula III or IV, or a mixture thereof:

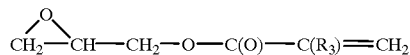
$$(III)$$

or

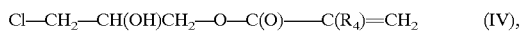
$$Cl—CH_2—CH(OH)CH_2—O—C(O)—C(R_4)=CH_2 \quad (IV),$$

wherein $R_3$ and $R_4$ are each independently H or the same or different alkyl radical of 1 to about 4 carbon atoms.

In the above compositions, preferably in formula I, $R_f$ is a straight chain perfluoroalkyl group of 2 to about 20 carbon atoms, or a mixture thereof, A is O and Q is an alkylene of 1 to about 15 carbon atoms. More preferably the monomer of formula I is a perfluoroalkylethyl acrylate having the formula $CF_3CF_2(CF_2)_xC_2H_4OC(O)$—$C(H)=CH_2$ wherein x is an even integer from 4 to 18, or a mixture thereof. Most preferred is a mixture having a perfluoroalkyl carbon chain length distribution (x) by weight of about 50% of 8-carbon, about 29% of 10-carbon, about 11% of 12-carbon, and with smaller percentages of 6-carbon, 14-carbon and longer chain lengths. Preferably the monomer of formula 11 is diethylaminoethyl methacrylate which has undergone partial or full salinization or quaternization and the monomer of formula III is glycidyl methacrylate.

Preferably the proportion of the monomer of formula I in the copolymer is from about 79% to about 85% by weight, the proportion of the monomer of formula II in the copolymer (in its salt form) is from about 13% to about 19% by weight and the proportion of the monomer of formula III or IV, or a mixture thereof, in the copolymer is from about 1% to about 5% by weight.

The above copolymers are known per se from U.S. Pat. No. 5,674,961, the disclosure of which is incorporated by reference, where they are taught to be useful in treating paper and paper products. They are also known per se from U.S. Pat. No. 5,919,527, the disclosure of which is incorporated by reference, where they are taught to be useful in treating certain hard surfaces including construction materials such as brick, stone, wood, concrete, ceramics, tile, glass, stucco, gypsum drywall, particle board, or chip board. An especially preferred copolymer of of the type described above is commercially available from the Consumer Care Division of Ciba Specialty Chemicals Corporation, High Point, N.C. as a 30% aqueous composition designated LODYNE P-514.

Component (B) is a penetration assistant. A penetration assistant is any surface-active organic substance that enhances the ability of an aqueous solution or self-dispersed emulsion or dispersion of the copolymer to penetrate and wet out an asphaltic substrate.

Suitable penetration assistants include both ionic and nonionic surfactants. Preferably the penetration assistant is, or contains a nonionic, cationic or amphoteric surfactant. The penetration assistant may be monomeric, oligomeric or polymeric. A large number of commercially available surfactants are described in McCutcheon's 1994 Volume 1: Emulsifiers and Detergents, North American Edition, McCutcheon's Division, MC Publishing Co., Glen Rock, N.J.

Advantageously the penetration assistant is used in liquid form, either as a neat liquid or as an aqueous or non-aqueous solution of the active substance. A particularly preferred penetration assistant is a proprietary liquid mixture known as Solvent-D, which is available from Polypore, Inc., Tucson, Ariz. Solvent-D contains propylene carbonate as solvent.

The amount of the penetration assistant to employ can vary widely. Generally an effective amount of the penetration assistant will reduce the surface tension of water by at least 15 percent, preferably by 20 to 60 percent. Advantageously the composition contains from about 0.01 to 1% by weight of a penetration assistant, preferably from 0.05 to 0.4% and more preferably from 0.08 to 0.15% by weight of the penetration assistant. These weight percentages are on an "as is" basis, meaning that the presence or absence of a solvent or a diluent in the commercially available material is ignored. Since the dilute aqueous solution or self-dispersed emulsion or dispersion of the fluorochemical copolymer already has a substantially lower surface tension than water, the surface tension lowering effect of the penetration assistant will normally be lower than it is with pure water.

The present invention also comprises a process which provides asphaltic materials with increased resistance to damage from water, oil and weather, which process comprises treating said materials with an aqueous composition containing:

(A) from about 0.1 to 4% by weight, on a 100% solids basis, of an aqueous solution or self-dispersed emulsion or dispersion of a copolymer which is a reaction product of monomers containing fluorinated groups, cationic groups and optionally nonionic groups, optionally (B) an effective amount of a penetration assistant, and (C) water to make up 100%.

Preferably the process comprises treating above substrates with an aqueous composition which comprises from about 0.2 to 2% by weight of the aqueous solution or self-dispersed emulsion or dispersion of the copolymer on a 100% solids basis, and from about 0.01 to 1% by weight of the penetration assistant.

In a preferred process the copolymer in (A) is a reaction product of from about 60–90% by weight of one or more meth(acrylate) monomers containing polyfluorinated alkyl groups, from about 10 to about 40% by weight of one or more meth(acrylate) monomers containing cationic groups and from about 1 to about 10% by weight of one or more monomers containing nonionic groups. Preferably the nonionic group is selected from the group consisting of ethylene, propylene, isobutene, chloro-3-isobutene-1, butadiene, isoprene, chloro- and dichloro-butadienes, fluoro- and difluoro-butadienes, vinylidine chloride, vinyl- or vinylidine fluoride, allyl bromide, methallyl chloride, vinyl-toluene, alpha-methylstyrene, alpha-cyanomethylstyrene, divinylbenzene, N-vinylcarbazole, methyl vinyl ketone, allyl acetate, allyl propionate, allyl isobutyrate, allyl heptanoate, cetyl vinyl ether, dodecyl vinyl ether, allyl-, methyl-, ethyl-, propyl-, isopropyl-, butyl-, isobutyl-, hexyl-, heptyl-, ethyl-2-hexyl-, cyclohexyl-, lauryl-, stearyl- or ethoxyethyl esters of acrylic, methacrylic, alpha-chloroacrylic, crotonic, maleic, fumaric, itaconic, citraconic and senecioic acid, glycol or polyalkyleneglycol diacrylates and dimethacrylates, acrylonitrile, methacrylonitrile, chloro-2-acrylonitrile, cyano-2-ethyl acrylate, methylene glutaronitrile, vinylidene cyanate, isopropyl cyanoacrylate, trisacryloyl-hexahydro-s-triazine, allyl alcohol, allyl glycolate, isobutenediol, allyloxyethanol, o-allylphenol, divinylcarbinol, glycerol-allyl ether, acrylamide, methacrylamide, maleamide and maleimide, N-(cyanoethyl)acrylamide, N-isopropyl-acrylamide, diacetone-acrylamide, N-(hydroxymethyl)-acrylamide and methacrylamide, N-(alkoxymethyl)-acrylamides and methacrylamides, glyoxal-bis-acrylamide, amino-3-crotononitrile, monoallylamine, vinylpyridines, glycidyl acrylate or methacrylate and their chlorohydrins, allyl glycidyl ether and acrolein. It is especially preferred that the nonionic monomer comprises at least one monomer selected from the group consisting of glycidyl acrylate or methacrylate and their chlorohydrins.

A particularly preferred process comprises treating above substrates with an aqueous composition wherein the copolymer in (A) is a reaction product of monomers copolymerized in the following percentages by weight, relative to the total weight of the copolymers:

(a) from about 60% to about 90% of at least one monomer of the formula I:

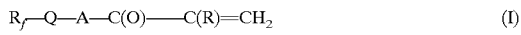
$$R_f-Q-A-C(O)-C(R)=CH_2 \quad (I)$$

wherein $R_f$ is a straight or branched-chain perfluoroalkyl group of from 2 to about 20 carbon atoms, R is H or $CH_3$, A is O, S, or N(R'), wherein R' is H or an alkyl of from 1 to 4 carbon atoms, Q is alkylene of 1 to about 15 carbon atoms, hydroxyalkylene of 3 to about 15 carbon atoms, $-(C_nH_{2n})(OC_qH_{2q})_m-$, $-SO_2-NR'(C_nH_{2n})-$, or $-CONR'(C_nH_{2n})-$, wherein R' is H or an alkyl of 1 to 4 carbon atoms, n is 1 to 15, q is 2 to 4, and m is 1 to 15;

(b) from about 10 to about 40% of at least one monomer of the formula II:

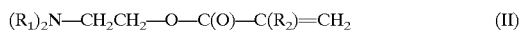
$$(R_1)_2N-CH_2CH_2-O-C(O)-C(R_2)=CH_2 \quad (II)$$

wherein $R_1$ is an alkyl group of from 1 to 3 carbon atoms, $R_2$ is H or an alkyl radical of 1 to 4 carbon atoms, and wherein the nitrogen is 40 to 100% quaternized or in the form of a salt; and (c) from about 1 to about 7% of at least one monomer of formula III or IV, or a mixture thereof:

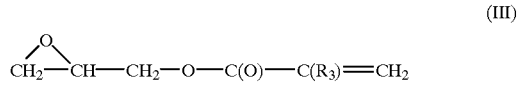
$$\underset{CH_2-CH}{\overset{O}{\diagup \diagdown}}-CH_2-O-C(O)-C(R_3)=CH_2 \quad (III)$$

or

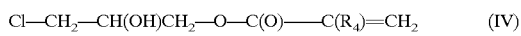
$$Cl-CH_2-CH(OH)CH_2-O-C(O)-C(R_4)=CH_2 \quad (IV)$$

wherein $R_3$ and $R_4$ are each independently H or the same or different alkyl radical of 1 to about 4 carbon atoms.

In the above process preferably $R_f$ is a straight chain perfluoroalkyl group of 2 to about 20 carbon atoms, or a mixture thereof, A is O and Q is an alkylene of 1 to about 15 carbon atoms, the monomer of formula II is diethylaminoethyl methacrylate which has undergone partial or full salinization or quaternization and the monomer of formula III is glycidyl methacrylate.

Preferably the proportion of the monomer of formula I in the copolymer is from about 79% to about 85% by weight, the proportion of the monomer of formula II in the copolymer (in its salt form) is from about 13% to about 19% by weight and the proportion of the monomer of formula III or IV, or a mixture thereof, in the copolymer is from about 1% to about 5% by weight.

The present invention also relates to an asphaltic material which has increased resistance to damage from water, oil and weather, which material has been treated with a composition which comprises:

(A) from about 0.1 to 4% by weight, on a 100% solids basis, of an aqueous solution or self-dispersed emulsion or dispersion of a copolymer which is a reaction product of monomers containing fluorinated groups, cationic groups and nonionic groups, optionally (B) an effective amount of a penetration assistant, and (C) water to make up 100%.

The compositions of the present invention are prepared by simply combining an aqueous solution or self-dispersed emulsion or dispersion typically containing 20 to 35% by weight of the fluorochemical copolymer and, if desired, the penetration assistant and any conventional additives, for example a preservative such as an antimicrobial, a bactericide, a fungicide or an algicide, with water of about neutral pH with gentle agitation. Preferably the compositions are prepared by adding the fluorochemical copolymer and, if desired, the penetration assistant and any conventional additives to the water. Advantageously deionized or distilled water of about neutral pH is employed.

If desired a concentrate of the inventive composition may be prepared by combining a more concentrated aqueous solution or self-dispersed emulsion or dispersion typically containing 20 to 35% by weight of the fluorochemical copolymer, the penetration assistant and any conventional additives and, optionally, none or preferably only a part of the water. The concentrated composition is then diluted with the appropriate amount of water to obtain a suitable concentration of the fluorochemical copolymer prior to use in the inventive treatment process.

The compositions of the present invention can be applied to the surface of an asphaltic material by any known method, for example by soaking, impregnation, immersion, brushing, rolling or spraying. Advantageously the treating compositions of the present invention are applied to the surface to be protected by spraying, and in particular by spraying with a compressed air sprayer. Suitable spraying equipment is commercially available.

The amount of the compositions of the present invention to apply to the surface of an asphaltic material is not critical. The amount should be sufficient to thoroughly wet out the surface, but excessive runoff should be avoided for ecological reasons. Naturally a relatively porous substrate, such as a roadway prepared from a mixture of asphalt and relatively large mineral aggregates, will take up substantially higher amounts of the treating composition due to subsurface penetration while others, like asphaltic roofing surfaces will require very little. After application of the inventive composition to a substrate the treated surface should be allowed to thoroughly dry before it is exposed to water or oil.

Interestingly, a porous substrate largely retains its porosity after the inventive treatment, so air and moisture vapor can still pass through. This shows that the surface is not sealed as it would be by a conventional coating. Yet liquid water and oil are strongly repelled as a result of the inventive treatment. The treated substrate also retains its natural appearance.

The surface of a great variety of asphaltic materials can be advantageously treated with the inventive compositions. These include roads and similar asphaltic traffic-bearing surfaces such as driveways, parking areas and airport runways, as well as asphalt composition shingles and asphalt-coated roofing systems.

Of special interest are roadways and similar asphaltic traffic-bearing surfaces, especially those that are exposed to freeze-thaw cycles and treated with salts to melt snow and ice. Treatment of such surfaces with the compositions of the present invention can greatly mitigate freeze-thaw damage and thus decrease maintenance and extend the lifetime of the roadway in a very cost-effective manner.

The effectiveness of the surface treatment by the inventive compositions is primarily evaluated visually by applying drops of water or motor oil (Pennzoil® 30 weight) to a treated and dried horizontal surface. Whereas water normally wets out an asphaltic material and forms a continuous sheet or film, or is slowly absorbed by it, depending on its porosity, water is so strongly repelled as a result of the inventive treatment that it generally simply forms small, almost hemispherical beads upon the surface of the treated material. Normally somewhat wider beads which exhibit a lower contact angle are obtained upon treatment in the absence of the wetting agent. The water may be left on the treated surface for an indefinite period of time. Eventually it simply evaporates leaving no indication of damage to the surface. Even after extensive freeze-thaw cycling, since water doesn't penetrate the treated surface and the adhesion of ice is substantially impaired, there is no evidence of damage to the surface.

Motor oil also normally wets out and spreads across an asphaltic material and is slowly absorbed by it. However, if the surface of an asphaltic material is treated according to the inventive process there is substantially less spreading and absorption. Hence even after contact for an extended period, oil can be readily removed by blotting it up with an absorbent material or rinsing it off with a stream of water. The surface of an asphaltic material treated according to the inventive process shows improved properties relative to the same surface treated only with the copolymer.

The following non-limiting examples illustrate the preparation and use of the inventive compositions. However the invention is not limited thereto. All parts are parts by weight.

Preparation of an inventive composition

To a vessel containing 100 parts of deionized water is gradually added with moderate stirring 2.0 parts of LODYNE P-514, an aqueous composition comprising about 30% by weight of a cationic fluorochemical copolymer which is commercially available from the Consumer Care Division of Ciba Specialty Chemicals Corporation, High Point, N.C., followed by 0.1 parts of Solvent-D, a proprietary liquid which is available from Polypore, Inc., Tucson, Ariz. If desired a compatible preservative or other additive is then added and the stirring is continued until the mixture is visually homogeneous. It is stable on storage.

Application of an inventive composition to a surface

Into a compressed air spraying apparatus is placed a solution having the above composition. Samples of asphaltic pavement obtained from roadway demolition are laid flat on a protected surface and then sprayed with the inventive composition until their surfaces are thoroughly wet out. Then the treated materials are allowed to thoroughly dry before they are evaluated as described above. The treated materials still exhibit excellent water and oil repellency after about a year of storage.

Several small sections of asphaltic roadway in Tucson, Arizona are sprayed with the inventive composition as described above. Water still beads up on the treated surfaces after almost a year of exposure.

Asphalt composition shingles are laid flat on a protected surface and then sprayed with the inventive composition as described above until their surfaces are thoroughly wet out. Then the treated materials are allowed to thoroughly dry before they are evaluated. Even after extended storage and periodic freeze-thaw cycling, there is no evidence of damage to the surface.

What is claimed is:

1. A process which provides an asphaltic material with increased resistance to damage from water, oil and weather, which process comprises treating said material with an aqueous composition containing:
   (A) from about 0.1 to 4% by weight on a 100% solids basis of an aqueous solution or self-dispersed emulsion or dispersion of a copolymer which is a reaction product of monomers containing fluorinated groups, cationic groups and nonionic groups, and optionally
   (B) an amount of a penetration assistant which is effective to increase the ability of an aqueous solution or self-dispersed emulsion or dispersion of (A) to penetrate and wet out the asphaltic material, and
   (C) water to make up 100%.

2. A process according to claim 1, wherein the aqueous composition comprises from about 0.2 to 2% by weight of the aqueous solution or self-dispersed emulsion or dispersion of the copolymer on a 100% solids basis, and from about 0.01 to 1% by weight of the penetration assistant.

3. A process according to claim 1, wherein the copolymer in (A) is a reaction product of from about 60–90% by weight of one or more meth(acrylate) monomers containing polyfluorinated alkyl groups, from about 10 to about 40% by weight of one or more meth(acrylate) monomers containing cationic groups and from about 1 to about 10% by weight of one or more monomers containing nonionic groups.

4. A process according to claim 1, wherein the copolymer in (A) is a reaction product of one or more monomers containing nonionic groups selected from the group consisting of ethylene, propylene, isobutene, chloro-3-isobutene-1, butadiene, isoprene, chloro- and dichloro-butadienes, fluoro- and difluoro-butadienes, vinylidine chloride, vinyl- or vinylidine fluoride, allyl bromide, methallyl chloride, vinyl-toluene, alpha-methylstyrene, alpha-cyanomethylstyrene, divinylbenzene, N-vinylcarbazole, methyl vinyl ketone, allyl acetate, allyl propionate, allyl isobutyrate, allyl heptanoate, cetyl vinyl ether, dodecyl vinyl ether, allyl-, methyl-, ethyl-, propyl-, isopropyl-, butyl-, isobutyl-, hexyl-, heptyl-, ethyl-2-hexyl-, cyclohexyl-, lauryl-, stearyl- or ethoxyethyl esters of acrylic, methacrylic, alpha-chloroacrylic, crotonic, maleic, fumaric, itaconic, citraconic and senecioic acid, glycol or polyalkyleneglycol diacrylates and dimethacrylates, acrylonitrile, methacrylonitrile, chloro-2-acrylonitrile, cyano-2-ethyl acrylate, methylene glutaronitrile, vinylidene cyanate, isopropyl cyanoacrylate, trisacryloyl-hexahydro-s-triazine, allyl alcohol, allyl glycolate, isobutenediol, allyloxy-ethanol, o-allylphenol, divinylcarbinol, glycerol-allyl ether, acrylamide, methacrylamide, maleamide and maleimide, N-(cyanoethyl)acrylamide, N-isopropyl-acrylamide, diacetone-acrylamide, N-(hydroxymethyl)-acrylamide and methacrylamide, N-(alkoxymethyl)-acrylamides and methacrylamides, glyoxal-bis-acrylamide, amino-3-crotononitrile, monoallylamine, vinylpyridines, glycidyl acrylate or methacrylate and their chlorohydrins, allyl glycidyl ether and acrolein.

5. A process according to claim 4, wherein the nonionic monomer comprises at least one monomer selected from the group consisting of glycidyl acrylate or methacrylate and their chlorohydrins.

6. A process according to claim 1, wherein the copolymer in (A) is a reaction product of monomers copolymerized in the following percentages by weight, relative to the total weight of the copolymers:

(a) from about 60% to about 90% of at least one monomer of the formula I:

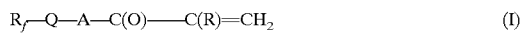

$$R_f—Q—A—C(O)——C(R)=CH_2 \qquad (I)$$

wherein $R_f$ is a straight or branched-chain perfluoroalkyl group of from 2 to about 20 carbon atoms, R is H or $CH_3$, A is O, S, or N(R'), wherein R' is H or an alkyl of from 1 to 4 carbon atoms, Q is alkylene of 1 to about 15 carbon atoms, hydroxyalkylene of 3 to about 15 carbon atoms, —$(C_nH_{2n})$ $(OC_qH_{2q})_m$—, —$SO_2$—$NR'(C_nH_{2n})$—, or —$CONR'(C_nH_{2n})$—, wherein R' is H or an alkyl of 1 to 4 carbon atoms, n is 1 to 15, q is 2 to 4, and m is 1 to 15;

(b) from about 10 to about 40% of at least one monomer of the formula II:

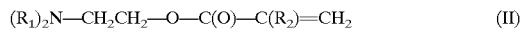

$$(R_1)_2N—CH_2CH_2—O—C(O)—C(R_2)=CH_2 \qquad (II)$$

wherein $R_1$ is an alkyl group of from 1 to 3 carbon atoms, $R_2$ is H or an alkyl radical of 1 to 4 carbon atoms, and wherein the nitrogen is 40 to 100% quaternized or in the form of a salt; and (c) from about 1 to about 7% of at least one monomer of formula III or IV, or a mixture thereof:

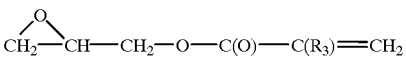

(III)

or

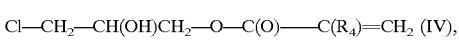

$$Cl—CH_2—CH(OH)CH_2—O—C(O)——C(R_4)=CH_2 \quad (IV),$$

wherein $R_3$ and $R_4$ are each independently H or the same or different alkyl radical of 1 to about 4 carbon atoms.

7. A process according to claim 6, wherein $R_f$ is a straight chain perfluoroalkyl group of 2 to about 20 carbon atoms, or a mixture thereof, A is O and Q is an alkylene of 1 to about 15 carbon atoms, the monomer of formula II is diethylaminoethyl methacrylate which has undergone partial or full salinization or quaternization and the monomer of formula III is glycidyl methacrylate.

8. A process according to claim 6, wherein the proportion of the monomer of formula I in the copolymer is from about 79% to about 85% by weight, the proportion of the monomer of formula II in the copolymer (in its salt form) is from about 13% to about 19% by weight and the proportion of the monomer of formula III or IV, or a mixture thereof, in the copolymer is from about 1% to about 5% by weight.

9. A process according to claim 1, wherein the aqueous composition is sprayed onto the surface of the asphaltic material with a compressed air sprayer.

10. A process according to claim 6, wherein the aqueous composition is sprayed onto the surface of the asphaltic material with a compressed air sprayer.

11. A process according to claim 1, wherein the asphaltic material is an asphaltic traffic-bearing surface, asphalt composition shingles or an asphalt-coated roofing system.

* * * * *